March 8, 1960 H. HAVSTAD 2,928,002

AMPLITUDE SENSITIVE CIRCUIT

Filed March 6, 1956

INVENTOR
HARALD HAVSTAD
BY Alfred C. Hill
AGENT

United States Patent Office 2,928,002

Patented Mar. 8, 1960

2,928,002

AMPLITUDE SENSITIVE CIRCUIT

Harald Havstad, Allendale, N.J., assignor to International Telephone and Telegraph Corporation, Nutley, N.J., a corporation of Maryland Application March 6, 1956, Serial No. 569,845

5 Claims. (Cl. 250—27)

This invention relates to amplitude sensitive circuits and more particularly to an amplitude sensitive amplifier for utilization in null detectors, switches or high frequency controlled relays and the like wherein an accurate on-off indicator is required.

On-off indicators as employed in electronic relay circuits are used in most microwave communication link systems to indicate failures of components or units and to initiate switching pulses for automatic switching of standby equipment.

When electrical relays in combination with vacuum tubes are used in this type of service, it is desirable that the current differential, i.e., the difference between the current in the magnetizing coil necessary to draw the armature in and the current in the coil at which the armature is released, be as small as possible to obtain accurate control of failure indication and switchover. However, for highly reliable relays, this differential is comparatively large, in the order of 4–1 in current.

It is an object of this invention to provide a circuit which is reliable in operation and which effectively responds to small differences in the input voltage to control the on and off positions of a relay.

Another object of this invention is to provide an amplitude sensitive amplifier wherein the average plate current is a critical function of small changes in input signal magnitude.

Another object of this invention is to provide a stable and reliable electronic relay circuit which will substantially reduce the differential between the input signal amplitude required to produce energizing current in the magnetizing coil of a relay and the maximum input signal amplitude incapable of producing energizing current in the magnetizing coil of a relay.

A feature of this invention is the provision of an amplifier having both an A.C. (alternating current) feedback means and a D.C. (direct current) feedback means coupled effectively between the output and input of the amplifier, both of the fedback means being responsive to the signal at the output of the amplifier to render the conduction characteristics nonlinear to accomplish the above objects of this invention.

Another feature of this invention is the provision of a peak detector coupled to the output of the amplifier of my circuit to produce a voltage from the signal at the output which will subtract from the bias voltage at the input of the amplifier and thereby constitute the D.C. feedback feature of my invention. The A.C. feedback is accomplished by utilizing the condenser of the peak detector and the conductor coupled from the condenser to the input of the amplifier, as hereinafter described, the A.C. feedback imparting stability to the entire circuit.

Figure 1:
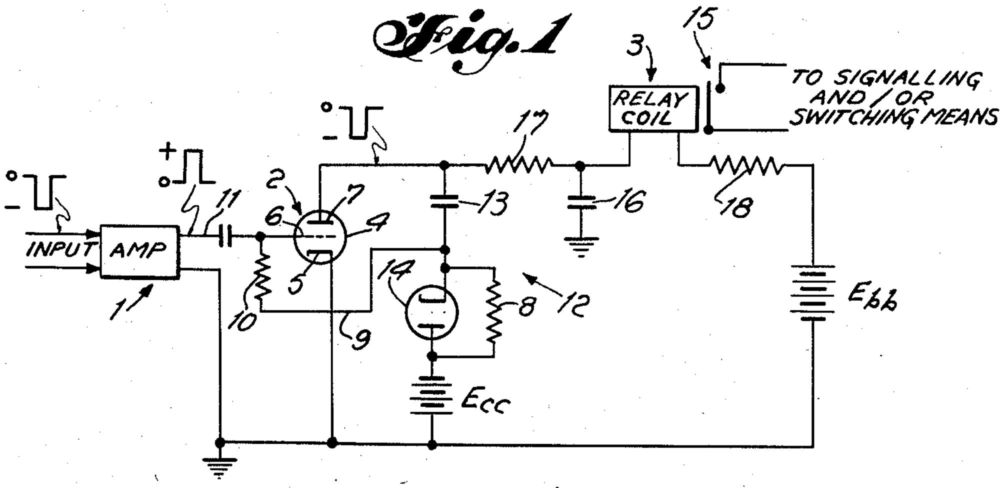
Figure 2:
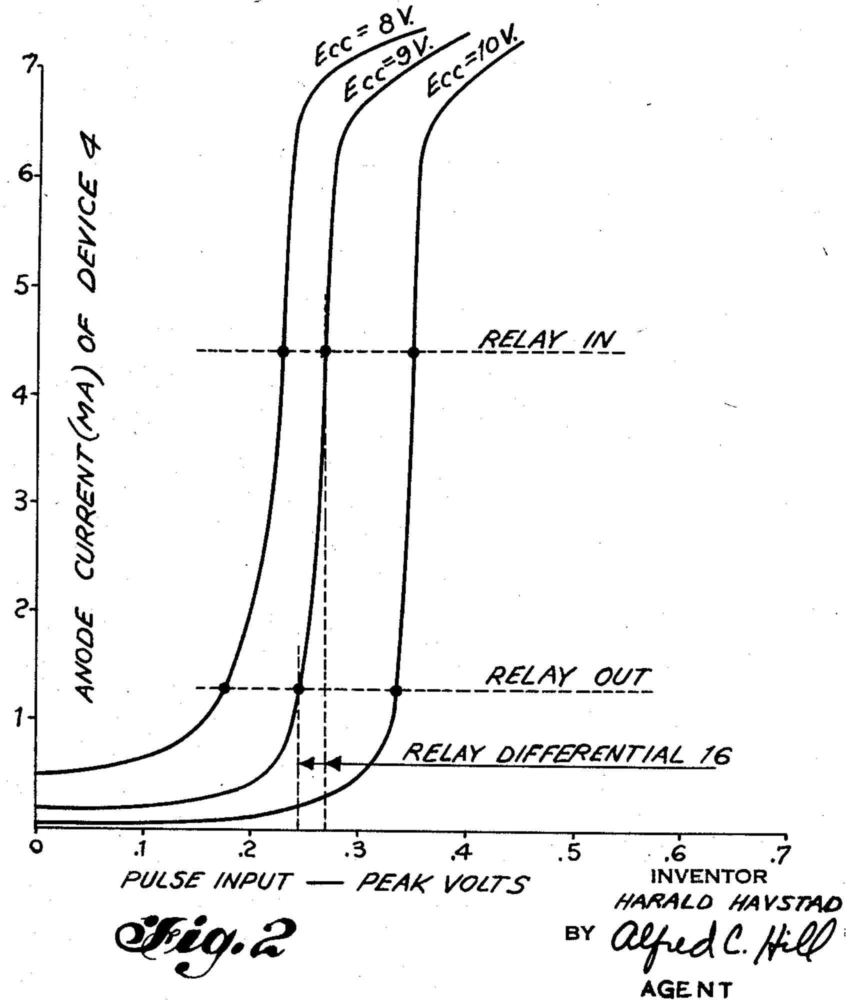

The above-mentioned and other features and objects of this invention will become more apparent by reference to the following description taken in conjunction with the accompanying drawings, in which:

Fig. 1 is a schematic diagram of an embodiment following the principles of this invention; and Fig. 2 illustrates a set of curves useful in understanding the operation of the circuit of Fig. 1.

Referring to Fig. 1, there is illustrated a signal source 1 of positive pulses for application to an amplifier 2. Source 1 may be an amplifier as indicated in the drawing or any other preceding circuitry which will supply a signal to the input of amplifier 2. Connected to the output of amplifier 2 is a relay magnetizing coil 3, the operation of which the output current is to control over a relatively small differential of input signal. It is to be understood that the output current of amplifier 2 may be utilized to control other devices than relay coil 3 where it is required that the device responds to small changes of magnitude of the input signal to amplifier 2.

Amplifier 2 is illustrated as including an electron discharge device 4 having at least a cathode 5, a control grid 6 and an anode 7. With no signal input, electron discharge device 4 is biased close to cutoff (0.5–0.2 milliampere of plate current) by the bias voltage source $E_{cc}$ coupled to control grid 6 by means of resistor 8, conductor 9 and resistor 10. In this condition, the gain of device 4 is low (one or less). When positive pulses are impressed on grid 6 through coupling condenser 11, negative pulses appear in the anode circuit of device 4. These negative pulses are rectified by the peak detector 12 consisting of condenser 13, diode 14 and resistor 8. The positive D.C. voltage, developed by peak detector 12, is in series with the negative grid bias $E_{cc}$. Therefore, the positive D.C. voltage developed from the pulse signal of the anode 7 reduces the total bias on grid 6 which increases the gain and the amplitude of the pulses supplied to peak detector 12. This causes an additional drop in the negative bias on grid 6. This action takes place until the total net bias on grid 6 is substantially equal to the peak amplitude of the pulses. At this point, the device 4 starts to draw grid current, and no further decrease in bias can take place. The plate current is of such magnitude as to energize the relay 3.

It will be observed that the circuit configuration described provides a positive D.C. feedback by the action of peak detector 12 and a negative A.C. feedback through condenser 13, each of the feedback voltages being controlled by the signal appearing at anode 7. Removal of the signal or a decrease thereof by the ratio 1.05–1 will eliminate or sufficiently reduce the D.C. voltage developed by the peak detector 12 such that no voltage, or a smaller amount of voltage, is fed back to the grid, causing the bias $E_{cc}$ to cut off or sufficiently reduce the plate current to demagnetize relay 3. The negative A.C. feedback adds to the stability of the operation of the circuit hereinabove described.

For the example of utilization disclosed in Fig. 1, when relay coil 3 is energized, the proper magnitude of signal is being applied to grid 6 and the contacts 15 are open. As soon as the signal is reduced by a factor of 1.05–1 or completely eliminated, the relay coil will be deenergized, contacts 15 will close and signaling or switching action, or both, will start to indicate a failure or malfunction of components or units in the over-all system. It is to be understood, however, that the amplitude sensitive amplifier may be utilized in conjunction with components where it is necessary that the average plate current is a critical function of small changes in input signal magnitude and it is not limited to the utilization disclosed in Fig. 1.

Fig. 2 shows the anode current plotted as a function of the input peak volts for several fixed biases $E_{cc}$. These curves illustrate the relatively small relay differential 16 that is capable with the circuit of this invention, which is a substantial reduction of the relay differential heretofore experienced with circuits of the prior art. It will be noticed that for small changes of peak input voltage of the signal the anode current of device 4 experiences a relatively large change due to the action of the D.C.

feedback arrangement. It is through the action of the D.C. feedback that the relay responds to a differential in the input current or voltage of 1.05–1 as compared with the prior art differential of 4–1.

The curves illustrated in Fig. 2 were obtained by employing the values of the components of this circuit as follows:

| | |
|---|---|
| Device 4 | 2C51 tube type. |
| Diode 14 | Crystal diode 1N34. |
| Condenser 11 | 0.1 mf. |
| Condenser 13 | 0.1 mf. |
| Condenser 16 | 0.1 mf. |
| Resistor 10 | 100,000 ohms. |
| Resistor 8 | 1,000,000 ohms. |
| Resistor 17 | 2,000 ohms. |
| Relay 3 | 4,000 ohm., 4.5 ma. relay. |
| Resistor 18 | 10,000 ohms. |

Resistors 17 and 18 help limit the maximum plate current through the coil 3 to a safe value, while condenser 16 functions as an anode circuit by-pass condenser.

As shown in the figures and described hereinabove, the circuit of this invention is essentially an amplitude sensitive amplifier in which the average anode current is a critical function of small changes in input signal magnitude, which, in the past, has been difficult to obtain with the desired stability. The amplitude sensitive amplifier lends itself to applications wherein an accurate on-off indicator is required, such as in null detectors, electronic switches, high frequency controlled relays and like apparatus, particularly where extended frequency response is essential. The circuit described also reduces the number of electron tubes required by combining A.C. and D.C. amplification.

While I have described above the principles of my invention in connection with specific apparatus, it is to be clearly understood that this description is made only by way of example and not as a limitation to the scope of my invention as set forth in the objects thereof and in the accompanying claims.

I claim:

1. An amplitude sensitive amplifier comprising an electron discharge device having at least an anode, a cathode and a control grid, a ground potential, means coupling said cathode to said ground potential, a source of signals, means coupling the signals of said source to said control grid, a condenser, means connecting one side of said condenser to said anode, a negative bias voltage source, means connecting the positive terminal of said bias source to said ground potential, a diode, means connecting the cathode of said diode to the other side of said condenser, means connecting the anode of said diode to the negative terminal of said bias source, a resistor coupled in parallel with said diode, means coupled between the cathode of said diode and said control grid, a peak detector including said condenser, said diode and said resistor developing a direct current voltage in response to the peak value of the signal at the anode of said discharge device for subtraction from the voltage of said bias source to render, in conjunction with the signal of the anode of said discharge device coupled through said condenser to said control grid, the average current at the anode of said discharge device a critical function of small changes in the magnitude of the signal of said source of signals.

2. An amplitude sensitive amplifier comprising an amplifier having an input and an output, a source of signals coupled to the input of said amplifier, a direct current bias voltage source coupled to the input of said amplifier, a first means coupled to the output of said amplifier to couple alternating current output voltage only to the input of said amplifier to oppose the signals of said source of signals at the input of said amplifier, and a second means to detect the peak voltage of said alternating current output voltage coupled to the output of said first means and effectively in series with said bias source to oppose the direct current voltage of said bias source coupled to the input of said amplifier by an amount equal to said peak voltage, said first and second means cooperating to render the average current at the output of said amplifier a critical function of small changes in the magnitude of the signals of said source of signals.

3. An amplitude sensitive amplifier comprising an amplifier having an input and an output, a source of signals coupled to the input of said amplifier, a direct current bias voltage source coupled to the input of said amplifier, a condenser coupled to the output of said amplifier to couple alternating current output voltage only to the input of said amplifier to oppose the signals of said source of signals at the input of said amplifier, and a peak detector circuit including a diode to detect the peak voltage of said alternating current output voltage coupled to the output of said condenser and effectively in series relation with said bias source to oppose the direct current voltage coupled to the input of said amplifier by an amount equal to said peak voltage, said condenser and said diode cooperating to render the average current at the output of said amplifier a critical function of small changes in the magnitude of the signals of said source of signals.

4. An amplitude sensitive amplifier comprising an amplifier having an input and an output, a source of signals coupled to the input of said amplifier, a reference potential, a series circuit coupled between the output of said amplifier and said reference potential, said series circuit including a first means coupled to the output of said amplifier to couple alternating current output voltage only therethrough, a negative bias source coupled to said reference potential and a second means coupled between said first means and said bias source to detect the peak voltage of said alternating current output voltage coupled through said first means, said second means being disposed in a predetermined relationship to said bias source to oppose the direct current voltage of said bias source by an amount equal to said peak voltage, and a conductor coupled between the junction of said first means and said second means and the input of said amplifier to render through the cooperation of said first and second means the average current at the output of said amplifier a critical function of small changes in the magnitude of the signals of said source of signals.

5. An amplitude sensitive amplifier comprising an amplifier having an input and an output, a source of signals coupled to the input of said amplifier, a reference potential, a series circuit coupled between the output of said amplifier and said reference potential, said series circuit including a condenser coupled to the output of said amplifier to couple alternating current output voltage only therethrough, a negative bias source coupled to said reference potential and a peak detector circuit including a diode coupled between said condenser and said bias source to detect the peak voltage of said alternating current output voltage coupled to said condenser, said diode being disposed in a predetermined relationship with respect to said bias source to oppose the direct current voltage of said bias source by an amount equal to said peak voltage, and a conductor coupled between the junction of said condenser and said diode and the input of said amplifier to render through the cooperation of said condenser and said diode the average current at the output of said amplifier a critical function of small changes in the magnitude of the signals of said source of signals.

References Cited in the file of this patent

UNITED STATES PATENTS

| | | |
|---|---|---|
| 2,125,982 | Belleville | Aug. 9, 1938 |
| 2,359,504 | Baldwin | Oct. 3, 1944 |
| 2,773,222 | Chauvin | Dec. 4, 1956 |

FOREIGN PATENTS

| | | |
|---|---|---|
| 921,094 | Germany | Dec. 9, 1954 |